United States Patent
Liu et al.

(10) Patent No.: US 9,665,866 B2
(45) Date of Patent: May 30, 2017

(54) SMART CARDS AND SMART CARD COMMUNICATION METHODS AND SYSTEMS

(71) Applicant: Nationz Technologies, Inc., Shenzhen (CN)

(72) Inventors: Shiying Liu, Shenzhen (CN); Rui Dong, Shenzhen (CN); Simin Guan, Shenzhen (CN); Hao Zou, Shenzhen (CN); Genping Wang, Shenzhen (CN)

(73) Assignee: NATIONZ TECHNOLOGIES, INC., Shenzhen (CN)

( * ) Notice: Subject to any disclaimer, the term of this patent is extended or adjusted under 35 U.S.C. 154(b) by 166 days.

(21) Appl. No.: 14/490,556

(22) Filed: Sep. 18, 2014

(65) Prior Publication Data
US 2015/0178718 A1 Jun. 25, 2015

Related U.S. Application Data

(63) Continuation of application No. PCT/CN2013/090065, filed on Dec. 20, 2013.

(30) Foreign Application Priority Data

Dec. 21, 2012 (CN) .......................... 2012 1 0562750
Jan. 23, 2013 (CN) .......................... 2013 1 0024867
(Continued)

(51) Int. Cl.
G06Q 20/00 (2012.01)
G06Q 20/34 (2012.01)
(Continued)

(52) U.S. Cl.
CPC ......... *G06Q 20/34* (2013.01); *G06K 19/0728* (2013.01); *G06Q 20/223* (2013.01); *G06Q 20/3272* (2013.01); *G06Q 20/3278* (2013.01); *G06Q 20/341* (2013.01); *G06Q 20/3415* (2013.01); *G06Q 20/382* (2013.01); *G07F 7/125* (2013.01)

(58) Field of Classification Search
CPC .. G06Q 20/105; G06Q 20/3272; G06Q 20/34; G06Q 20/4097
(Continued)

(56) References Cited

U.S. PATENT DOCUMENTS 5,949,044 A * 9/1999 Walker ................... G06Q 20/10
235/379
5,987,438 A * 11/1999 Nakano ................ G06K 7/0013
235/375

(Continued)

*Primary Examiner* — Steven Kim
(74) *Attorney, Agent, or Firm* — Finnegan, Henderson, Farabow, Garrett & Dunner, LLP (57) ABSTRACT

The present disclosure includes a smart card. The smart card includes an audio module to receive a money deduction request in a form of an external audio signal from an external device, wherein the monetary-amount deduction request includes a monetary amount to be deducted and the external device's identification information. The smart card further includes a data processing module to authenticate the external device's identification information, deduct the monetary amount from the smart card after the authentication of the external device's identification information is passed, and generate monetary-amount-deduction result information. The audio module transmits to the external device the monetary-amount-deduction result information in a form of an audio signal, wherein the monetary-amount-deduction result information includes a deducted monetary amount to be added to the external device and the smart card's identification information to be authenticated by the external device.

6 Claims, 6 Drawing Sheets

(30) Foreign Application Priority Data

| | | |
|---|---|---|
| Jan. 24, 2013 | (CN) | 2013 1 0027437 |
| Jan. 24, 2013 | (CN) | 2013 1 0027610 |
| Jan. 24, 2013 | (CN) | 2013 1 0027718 |
| Feb. 5, 2013 | (CN) | 2013 1 0046369 |

(51) Int. Cl.

| | |
|---|---|
| *G06K 19/07* | (2006.01) |
| *G06Q 20/32* | (2012.01) |
| *G06Q 20/38* | (2012.01) |
| *G06Q 20/22* | (2012.01) |
| *G07F 7/12* | (2006.01) |

(58) Field of Classification Search
USPC .............................................. 705/41, 65–68
See application file for complete search history.

(56) References Cited

U.S. PATENT DOCUMENTS

| | | | | |
|---|---|---|---|---|
| 6,029,888 A | * | 2/2000 | Harvey | G06K 7/0034 235/379 |
| RE36,788 E | * | 7/2000 | Mansvelt | G06Q 20/06 235/379 |
| 6,394,343 B1 | * | 5/2002 | Berg et al. | 235/379 |
| 6,425,522 B1 | * | 7/2002 | Matsumoto et al. | 235/380 |
| 6,659,343 B2 | * | 12/2003 | Tanaka | G06K 1/14 235/380 |
| 7,047,405 B2 | * | 5/2006 | Mauro | 713/166 |
| 7,334,735 B1 | * | 2/2008 | Antebi et al. | 235/492 |
| 2002/0014529 A1 | * | 2/2002 | Tanaka | 235/449 |
| 2002/0111918 A1 | * | 8/2002 | Hoshino et al. | 705/65 |
| 2003/0214443 A1 | * | 11/2003 | Bauregger | H01Q 1/38 343/700 MS |
| 2005/0236490 A1 | * | 10/2005 | Fortune et al. | 235/492 |
| 2006/0136544 A1 | * | 6/2006 | Atsmon et al. | 709/200 |
| 2007/0263365 A1 | * | 11/2007 | Yamada et al. | 361/737 |
| 2009/0030842 A1 | * | 1/2009 | Hoffman et al. | 705/66 |
| 2010/0085988 A1 | * | 4/2010 | Fukuda | H04L 25/02 370/480 |
| 2010/0243732 A1 | * | 9/2010 | Wallner | 235/380 |
| 2013/0036017 A1 | * | 2/2013 | Galloway | G06Q 20/40145 705/16 |
| 2013/0178203 A1 | * | 7/2013 | Venkataraman | H04W 4/16 455/423 |

* cited by examiner

SMART CARDS AND SMART CARD COMMUNICATION METHODS AND SYSTEMS

CROSS REFERENCE TO RELATED PATENT APPLICATIONS

This application is a continuation application of PCT Application No. PCT/CN2013/090065, filed on Dec. 20, 2013, titled "Smart Card and Smart Card Communication Method and System," which claims the priority and benefit of six Chinese Patent Application Nos. CN201210562750.9 (filed on Dec. 21, 2012 and titled "Data Transmission Method, Smart Card, and Card Reading Terminal"), CN201310024867.6 (filed on Jan. 23, 2013 and titled "Smart Card and Its Operating Method"), CN201310027437.X (filed on Jan. 24, 2013 and titled "Audio Card and Its Information Transmission Method"), CN201310027610.6 (filed on Jan. 24, 2013 and titled "Smart Card Device and Its Authentication Method"), CN201310027718.5 (filed on Jan. 24, 2013 and titled "One Type of Audio Cards"), and CN201310046369.1 (filed on Feb. 5, 2013 and titled "Smart Card"). PCT Application No. PCT/CN2013/090065 and the six Chinese patent applications are incorporated herein in their entirety by reference.

TECHNICAL FIELD

The present disclosure relates to the field of smart cards, and especially certain types of smart cards, smart card communication methods and communication systems.

BACKGROUND

Smart cards are widely used in people's daily lives. At present, smart cards, such as bus cards, bank cards, and the like, are generally magnetic cards or radio-frequency ("RF") integrated-circuit ("IC") cards. In existing cards, information carried by the cards can be easily copied or lost. Existing methods and designs for protecting data, however, have issues. For example, RF communications are greatly affected by metal casings, metal cannot be inlaid in a card, and high-end gold cards cannot be produced. Furthermore, both magnetic cards and RF IC cards need special card-reading devices to read data therefrom or write data thereto. Therefore, the existing smart cards need to be further improved.

SUMMARY

The present disclosure includes an exemplary smart card. Embodiments of the smart card include an audio module to receive an external audio signal from an external device and/or output to the external device an audio signal generated by the smart card; and a data processing module coupled to the audio module to process the received external audio signal, generate data to be output, and to output, via the audio module, the generated data in a form of an audio signal. In some embodiments, the audio module receives the external audio signal including a monetary-amount deduction request from an external device, wherein the monetary-amount deduction request includes information about a monetary amount to be deducted and identification information of the external device.

In certain embodiments, the data processing module authenticates the identification information of the external device, modifies monetary information stored in the smart card according to the information about the monetary amount to be deducted after the authentication of the identification information of the external device is passed, and generates the data including monetary-amount-deduction result information. In some embodiments, the audio module transmits to the external device the data including the monetary-amount-deduction result information in a form of an audio signal. The monetary-amount-deduction result information includes information about a deducted monetary amount and identification information of the smart card to be authenticated by the external device. The deducted monetary amount is to be added to a monetary amount stored in the external device according to the information about the deducted monetary amount after the authentication of the identification information of the smart card is passed.

The present disclosure includes another exemplary smart card. Embodiments of the smart card include a data processing module to generate a monetary-amount deduction request; and an audio module coupled to the data processing module to transmit to an external device the monetary-amount deduction request in a form of an audio signal, wherein the monetary-amount deduction request includes information about a monetary amount to be deducted and identification information of the smart card to be authenticated by the external device. Monetary information stored in the external device is to be modified according to the information about the monetary amount to be deducted after the authentication of the identification information of the smart card is passed.

In some embodiments, the audio module receives monetary-amount-deduction result information in a form of an audio signal from the external device, wherein the monetary-amount-deduction result information includes information about a deducted monetary amount and identification information of the external device. In certain embodiments, the data processing module authenticates the identification information of the external device, and adds the deducted monetary amount to a monetary amount stored in the smart card according to the information about the deducted monetary amount after the authentication is passed.

The present disclosure includes an exemplary smart card communication method. Embodiments of the smart card communication method include receiving a monetary-amount deduction request in a form of an external audio signal from an external device, wherein the monetary-amount deduction request includes information about a monetary amount to be deducted and identification information of the external device; authenticating the identification information of the external device; modifying monetary information stored in the smart card according to the information about the monetary amount to be deducted after the authentication of the identification information of the external device is passed; generating monetary-amount-deduction result information; and transmitting to the external device the monetary-amount-deduction result information in a form of an audio signal. The monetary-amount-deduction result information includes information about a deducted monetary amount and identification information of the smart card to be authenticated by the external device. The deducted monetary amount is to be added to a monetary amount stored in the external device according to the information about the deducted monetary amount after the authentication of the identification information of the smart card is passed.

The present disclosure includes another exemplary smart card communication method. Embodiments of the smart card communication method include generating, at a smart card, a monetary-amount deduction request; and transmitting to an external device the monetary-amount deduction request in a form of an audio signal. The monetary-amount deduction request includes information about a monetary amount to be deducted and identification information of the smart card to be authenticated by the external device. Monetary information stored in the external device is to be modified according to the information about the monetary amount to be deducted after the authentication of the identification information of the smart card is passed. Embodiments of the smart card communication method further include receiving monetary-amount-deduction result information in a form of an audio signal from the external device, wherein the monetary-amount-deduction result information includes information about a deducted monetary amount and identification information of the external device; authenticating the identification information of the external device; and after the authentication is passed, adding the deducted monetary amount to a monetary amount stored in the smart card according to the information about the deducted monetary amount.

An exemplary system in accordance with the present disclosure comprises a first smart card and a second smart card as an external device. In some embodiments, the first smart card receives a monetary-amount deduction request in a form of an external audio signal from the second smart card, wherein the monetary-amount deduction request includes information about a monetary amount to be deducted and identification information of the second smart card. The first smart card authenticates the identification information of the second smart card, and modifies monetary information stored in the first smart card according to the information about the monetary amount to be deducted after the authentication of the identification information of the second smart card is passed.

In certain embodiments, the first smart card generates monetary-amount-deduction result information, and transmits to the second smart card the monetary-amount-deduction result information in a form of an audio signal. The monetary-amount-deduction result information includes information about a deducted monetary amount and identification information of the first smart card. The second smart card receives the monetary-amount-deduction result information in the form of an audio signal from the first smart card, authenticates the identification information of the external device, and adds the deducted monetary amount to a monetary amount stored in the second smart card according to the information about the deducted monetary amount after the authentication is passed.

It is to be understood that both the foregoing general description and the following detailed description are exemplary and explanatory only and are not restrictive of the invention, as claimed.

DETAILED DESCRIPTION

Reference will now be made in detail to the exemplary embodiments illustrated in the accompanying drawings. Wherever possible, the same reference numbers will be used throughout the drawings to refer to the same or like parts.

A smart card in accordance with embodiments of this disclosure communicates with an external device using audio signals. The disclosed smart card has audio signal transmitting and/or receiving functions. The audio signals may be ultrasonic waves, infrasound waves, or any form of sound waves. In some embodiments, prior to receiving a trigger command and an external audio signal, the smart card is in a low-power-consumption operating mode, and operates at a minimum clock-frequency configuration. After receiving a trigger command and an external audio signal, the smart card switches to a full operating mode. In this mode, the smart card enters a process of receiving and transmitting audio signals. After completing the audio signal receiving and transmitting process, the smart card switches back to the low-power-consumption operating mode, and enters a next cycle phase. The smart card disclosed herein can be circular, square, and any of other shapes. A surface of the smart card can be engraved or printed with characters, graphics, etc., to enhance an aesthetic appearance.

Figure 1:
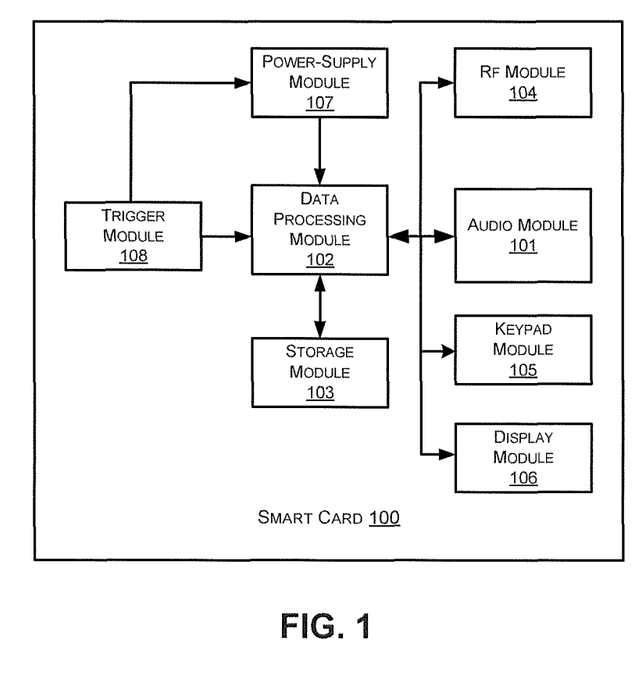
FIG. 1 is a schematic diagram illustrating an exemplary smart card in accordance with an embodiment of this disclosure.

FIG. 1 is a schematic diagram illustrating an exemplary smart card 100 in accordance with an embodiment of this disclosure. As shown in FIG. 1, smart card 100 comprises an audio module 101 and a data processing module 102 coupled to audio module 101. In some embodiments, smart card 100 may also comprise a storage module 103, an RF module 104, a keypad module 105, a display module 106, a power-supply module 107, and/or a trigger module 108.

In some embodiments, audio module 101 comprises an audio input module for receiving external audio signals and/or an audio output module for outputting audio signals. Data processing module 102 can be used to process audio signals received by the audio input module, and/or generate data and output the generated data through the audio output module in a form of audio signals. The audio input module and the audio output module can be located on a surface of smart card 100, while data processing module 102 can be located inside smart card 100. In some embodiments, a working frequency band of the audio input module and the audio output module can range from 5 KHz to 40 KHz, but is not limited to this range. The working frequency band of the audio input module and the audio output module is not limited to an audio range that can be heard by human ears. Instead, it can be expanded to an ultrasonic frequency band, or can be flexibly configured to any band based on needs.

In some embodiments, a microphone can serve as an exemplary audio input module. And the microphone can either be a microelectromechanical systems ("MEMS") microphone or any of other type of microphones. In some embodiments, a speaker, a buzzer, or a piezoelectric ceramic device, etc. can serve as an exemplary audio output module. In some embodiments, the piezoelectric ceramic device comprises a piezoelectric ceramic module and an audio signal adjustment circuit. When triggered, the piezoelectric ceramic module can be used to activate the audio signal adjustment circuit. The audio signal adjustment circuit can be used to send out audio signals using a corresponding wave band. The piezoelectric ceramic module, e.g., a piezoelectric ceramic thin film, is a kind of electronic sound element. When an external force is applied to make it produce vibrations, the piezoelectric ceramic module can produce an electrical signal output. An external force may be applied to the piezoelectric ceramic module by, for example, pressing, knocking, striking, or any other mode.

In some embodiments, data processing module 102 comprises a processing sub-module, an encoding module, a modulation module, and a digital-to-analog conversion module. In other embodiments, data processing module 102 includes a processing sub-module, an amplifier module, a filter module, an analog-to-digital conversion module, a demodulation module, and a decoding module. In some embodiments, data processing module 102 comprises a processing sub-module, an encoding module, a modulation module, an analog-to-digital conversion module, an amplifier module, a filter module, an analog-to-digital conversion module, a demodulation module, and a decoding module.

The processing sub-module can be used to generate data to be output in a digital format. The encoding module can be used to encode the generated digital data. The modulation module can be used to modulate the encoded digital data. The digital-to-analog conversion module can be used to convert the regulated digital signals (data) into analog signals (data), and output to an audio module, which outputs the analog audio signals. The amplifier module can be used to amplify the analog audio signals received by the audio module. The filtering unit can be used to filter the amplified analog signals. The analog-to-digital conversion module can be used to convert the filtered analog signals into digital signals. The demodulation module can be used to demodulate the converted digital signals. The decoding module can be used to decode the demodulated signals. The processing sub-module can be used to process the decoded data. The digital-to-analog conversion module can be a digital-to-analog (D/A) converter while the analog-to-digital conversion module can be an analog-to-digital (A/D) converter. The modulation type can be amplitude shift keying (ASK), frequency shift keying (FSK) or, phase-shift keying (PSK), etc.

In some embodiments, data processing module 102 also comprises a security module, which is coupled to the processing sub-module, the encoding module, and the decoding module. The security module can be used to encrypt the to-be-output data generated by the processing sub-module in a digital format, and decrypt, authenticate, and/or certify the data decrypted by the decoding module. In some embodiments, the security module may use an encryption algorithm that is a symmetric or asymmetric algorithm.

Referring back to FIG. 1, in some embodiments, smart card 100 also comprises a storage module 103 coupled to data processing module 102 and can be used for storing data, e.g., certification information, authentication information, a key (for encoding, decoding, encryption, decryption, or access), smart card 100's identification information, account information, and transaction records, etc. Smart card 100's account information may comprise an account balance, an account name, and other information. Smart card 100's transaction records can comprise a monetary amount of consumption, a number of consumptions, a location of consumption, and other information. Storage module 103 can be made of a nonvolatile storage medium, so that the information is not lost even in case of a power failure. Storage module 103 can be located inside smart card 100. In some other embodiments, storage module 103 can also be integrated into data processing module 102.

As shown in FIG. 1, in some embodiments, smart card 100 may also comprise an RF module 104, a keypad module 105, and/or a display module 106. Each of those modules may be coupled to data processing module 102.

Among those modules, RF module 104 may be used to receive an external RF signal, transmit the signal to data processing module 102 for processing, and/or acquire the to-be-output data from data processing module 102 and output it in a form of an RF signal. A working frequency of RF module 104 can be 13.56 MHz, 60 MHz-960 MHz, or 2.4 GHz-2.4835 GHz. Of course, in other embodiments, the working frequency of RF module 104 or audio module 101 can be flexibly configured according to actual needs, and it is not restricted in the present disclosure. An RF antenna of RF module 104 can be located on a surface of smart card 100. In some embodiments, the current widely-used RFID (Radio Frequency Identification) technology can be adopted in RF communications.

In some embodiments, RF module 104 and audio module 101 are independent from each other, and there is no electrical connection. Therefore, they can work independently without affecting each other. For example, when an RF card reader serves as an external device to communicate with smart card 100, RF module 104 can be selected to carry out an RF communication. When a mobile phone serves as an external device to communicate with smart card 100, audio module 101 can be selected to carry out an audio communication. In other words, as far as different external devices are concerned, smart card 100 can flexibly select an RF or audio channel to communicate with an external device. Smart card 100 can not only support a traditional RF channel application, but can also utilize an audio signal to communicate with an external device having an audio communication function. In this way, communication modes of smart card 100 are expanded, and it is possible to realize some audio-based applications when a dedicated card reader device is not provided. It enables users to manage a wide variety of business applications through one smart card, satisfying different application needs and bringing great conveniences to users.

Keypad module 105 can be used to receive a push-key signal, and transmit the signal to data processing module 102 for processing. Keypad module 105 can be placed on a surface of smart card 100. Through keypad module 105, users can realize digital inputting, selecting, confirming, and other functions (such as inputting password information, confirming transaction information, etc.). In some embodiments, keypad module 105 may use one button or a combination of several buttons to realize the above functions. The buttons can be capacitive, resistive, or switch buttons.

Display module 106 can be used to receive to-be-displayed data output by data processing module 102, and display the data. The to-be-displayed data includes, for example, smart card 100's identification information, an external device's identification information, power-supply module 107's remaining power level, etc. Also, it may include information for a certification and/or mobile payment process, for example, account information, prompting messages, transaction records, and other information. Among them, the account information may include an account balance, an account name, and other information. The transaction records may include a monetary amount of consumption, a number of consumptions, a location of consumption, and other information.

A specific display mode of display module 106 can also be flexibly configured according to actual needs. For example, when displaying the remaining power level, display module 106 may display a percentage of remaining power, or a remaining service time, etc. When displaying the account information, display module 106 may describe it in a form of text, image, or a combination thereof. Display module 106 can be located on a surface of smart card 100, coupled to data processing module 102, and controlled by data processing module 102, to facilitate users to timely master their own account information, records of consumption, etc. In some embodiments, display module 106 can be electronic paper, an LCD display panel, or an LED display panel. Electronic paper possesses a picture screen memory function, and retains the pictures and text displayed last time even when no power is provided. When displaying, electronic paper does not need a corresponding driver module to keep refreshing. Therefore, electronic paper has many advantages such as a high screen resolution, small power consumption, low manufacturing cost, etc. Electronic paper is suitable for portable product applications, such as the smart card disclosed in this disclosure. In some other embodiments, display module 106 can also be a touch screen so keypad module 105 can be omitted.

Through keypad module 105 and display module 106, users can acquire information stored on the card, without using a card reader terminal. Furthermore, it is also possible to carry out flexible operations and input a password through keypad module 105. In some embodiments, the security module in data processing module 102 can also encrypt and/or decrypt data inputted by users through keypad module 105. For example, when a user inputs a password through keypad module 105, the password can be encrypted and/or decrypted by the security module, and following operations can proceed only after data processing module 102 receives a correct instruction.

In some embodiments, smart card 100 may also include a channel-switching module (not shown in FIG. 1) used to switch between RF module 104 and audio module 101, specifically, switching between an RF receiving module and an audio input module, and switching between an RF transmission module and an audio output module. In some embodiments, the channel-switching module serves as a diverter switch, and its output terminal chooses connecting with RF module 104 or with audio module 101. That is, when needing to switch to RF module 104, the channel-switching module selects connecting with RF module 104 while disconnecting with audio module 101. Similarly, when needing to switch to audio module 101, the channel-switching module selects connecting with audio module 101 while disconnecting with audio module 104. In some other embodiments, an output terminal of the channel-switching module maintains a physical connection with both RF module 104 and audio module 101. When needing to switch to RF module 104, the channel-switching module activates RF module 104 to start operating, while shielding audio module 101. Similarly, when needing to switch to audio module 101, the channel-switching module activates audio module 101 to start operating, while shielding RF module 104.

An input terminal of the channel-switching module can connect with data processing module 102, and switch a communication mode under a control of data processing module 102. In some embodiments, the channel-switching module can be a manual control structure, the input terminal is a handle placed on a surface of smart card 100, and switches a communication mode under a manual operation.

In some embodiments, smart card 100 may also comprise a power-supply module 107 for supplying power to smart card 100. Power-supply module 107 may be located inside smart card 100. In some embodiments, power-supply module 107 is coupled to data processing module 102, through which power-supply module 107 indirectly supplies power to other modules that are coupled to data processing module 102, thereby simplifying the circuit. In other embodiments, power-supply module 107 can respectively connect with all modules requiring power in smart card 100, and supply power to these modules. For example, power-supply module 107 can respectively connect with audio module 101, data processing module 102, storage module 103, RF module 104, keypad module 105, display module 106, channel-switching module (not shown in FIG. 1), etc.

Figure 2:
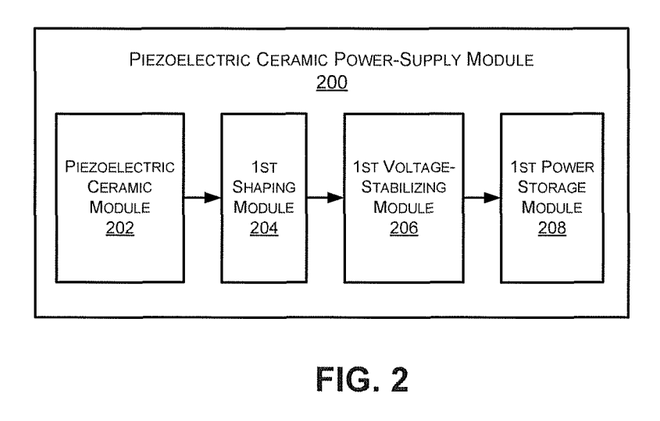
FIG. 2 is a schematic diagram illustrating an exemplary piezoelectric ceramic power-supply module in accordance with an embodiment of this disclosure.

In some embodiments, power-supply module 107 may comprise a magnetic power-supply module, a battery, a piezoelectric ceramic power-supply module, and/or a thermocouple power-supply module. Among them, the piezoelectric ceramic power-supply module can be used to convert an external pressure force into a power supply. In some embodiments, as shown in FIG. 2, a piezoelectric ceramic power-supply module 200 comprises a piezoelectric ceramic module 202, a first ($1^{st}$) shaping module 204, a first ($1^{st}$) voltage-stabilizing module 206, and a first ($1^{st}$) power storage module 208. In some embodiments, modules 202 through 208 may be connected in series or in a sequence, one after the other.

When a user applies a pressure force on a location of piezoelectric ceramic module 202, which as a result of an effect of the force, deforms and produces a corresponding electrical signal. 1st shaping module 204 then carries out a shape-correction treatment on the produced electrical signal. And 1st voltage-stabilizing module 206 then adjusts a voltage of the treated electrical signal to output a stable direct-current (DC) voltage. Finally, 1st power storage module 208 converts the stable DC voltage into electrical energy and store therein, to provide power for other modules in smart card 100. By using piezoelectric ceramic power-supply module 200, there is no need to worry about depletion of power supply, and module 200 makes smart card 100's service life longer. Piezoelectric ceramic module 202, such as a piezoelectric ceramic thin film, is thin and small enough to be conveniently placed inside smart card 100. In some embodiments, piezoelectric ceramic module 202 in module 202 shares a piezoelectric ceramic device of the above-mentioned audio output module.

Figure 3:
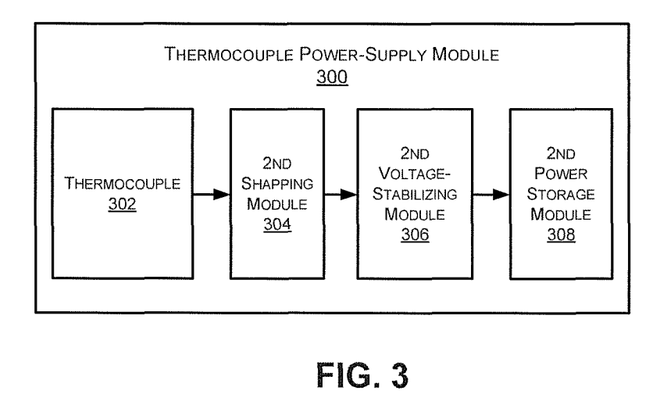
FIG. 3 is a schematic diagram illustrating a thermocouple power-supply module in accordance with an embodiment of this disclosure.

The thermocouple power-supply module can be used to convert external thermal energy into power-supply energy. In some embodiments, as shown in FIG. 3, a thermocouple power-supply module 300 comprises a thermocouple 302, a second ($2^{nd}$) shaping module 304, a second ($2^{nd}$) voltage-stabilizing module 306, and a second ($2^{nd}$) power storage module 308. In some embodiments, modules 302 through 308 may be corrected in series or in a sequence, one after the other.

A user can apply thermal energy on a location of thermocouple 302, for example, pressing a finger at the thermocouple location and heating the thermocouple by body temperature, or producing friction with smart card 100 and making smart card 100 generate heat. And thermocouple 302 converts the externally-provided heat energy into an electromotive force, and outputs a generated electrical voltage to 2nd shaping module 304. The generated electrical voltage forms into a stable DC voltage through a shape-correction treatment by 2nd shaping module 304 and a voltage adjustment by 2nd voltage-stabilizing module 306. 2nd power storage module 308 converts the stable DC voltage into electrical energy, stores therein, and provides power for other modules in smart card 100. By using thermocouple power-supply module 300 to convert external thermal energy into electrical energy for a power supply, there is no need to worry about depletion of power supply, and thermocouple power-supply module 300 makes the service life of smart card 100 longer. Furthermore, thermocouple 302 is thin and small enough to be conveniently placed inside smart card 100.

The magnetic power-supply module can be used to couple an external electromagnetic wave or an alternating magnetic field, and obtain power-supply energy. In some embodiments, the magnetic power-supply module may comprise an RF antenna module and a rectifying and voltage-stabilizing module. The RF antenna module can be used to couple an external electromagnetic wave or alternating magnetic field. The rectifying and voltage-stabilizing module can be used to rectify, filter, and convert the electromagnetic wave or alternating magnetic field coupled by the RF antenna module into stable DC. In some embodiments, this RF antenna module is shared by the above-mentioned RF module 104. That is, when smart card 100 uses RF module 104 for a communication, the RF antenna module in RF module 104 couples the external electromagnetic wave or alternating magnetic field. On one hand, the RF antenna module transmits the coupled electromagnetic wave or alternating magnetic field to data processing module 102. On the other hand, the RF antenna module transmits to the rectifying and voltage-stabilizing module.

A battery may include a rechargeable battery and/or a disposable battery, e.g., a thin film lithium battery, a thin-film battery, a flexible battery, a button battery, a photovoltaic cell, etc. In some embodiments, by coupling the battery to the magnetic power-supply module, piezoelectric ceramic power-supply module, and/or thermoelectric power-supply module, it is possible to utilize those power-supply modules to charge the battery. In this way, the excessive electrical energy collected by those power-supply modules is not wasted.

In some embodiments, smart card 100 may also comprise a power-supply switching module that respectively connects with each of power-supply modules such as the magnetic power-supply module, battery, piezoelectric power-supply module, and thermocouple power-supply module. The power-supply switching module switches between those power-supply modules or between at least two power-supply modules supplying the power concurrently.

In some embodiments, the power-supply switching module is a manually controlled switch and can be installed on a surface of smart card 100. In other embodiments, the power-supply switching module can also be realized by using other components. For example, keypad module 105, through data processing module 102, controls the power-supply switching module to switch between power-supply modes. In this case, the power-supply switching module needs to connect with data processing module 102.

In some other embodiments, the power-supply switching module realizes full automation. When detecting that the RF antenna module receives an electromagnetic wave, the power-supply switching module controls the battery, piezoelectric power-supply module, and thermocouple power-supply module to stop supplying power, and controls the rectifying and voltage-stabilizing module in magnetic power-supply module to supply power and charge the battery. When detecting that audio module 101 receives an audio signal, the power-supply switching module controls the battery to supply power.

Referring back to FIG. 1, in some other embodiments, smart card 100 may also comprise a trigger module 108 for receiving a trigger command, which is used to control starting or stopping operation of smart card 100. Trigger module 108 is coupled to power-supply module 107 and data processing module 102, respectively. In some other embodiments, trigger module 108 connects between power-supply module 107 and data processing module 102 and modules 107 and 102 do not connect directly (not shown in FIG. 1). Trigger module 108 can be used to control whether power-supply module 107 provides power to data processing module 102. For example, when receiving a trigger command to control starting operation of smart card 100, trigger module 108 starts operation of power-supply module 107, which starts supplying power to data processing module 102. Thereafter, power-supply module 107 starts supplying power to modules coupled to data processing module 102, such as audio module 101, RF module 104, keypad module 105, display module 106, the channel-switching module, and the power-supply switching module.

In some embodiments, trigger module 108 can be a push-button switch, a touch switch, a dual in-line package (DIP) switch, etc. For example, trigger module 108 can be a membrane push-button switch and installed on a surface of smart card 100, for a user to manually trigger it. In some other embodiments, a trigger command can also be triggered by an external device via an audio signal. In this case, trigger module 108 may be coupled to an audio input module. When receiving an external audio signal, the audio input module transmits a trigger command to trigger module 108.

Figure 4:
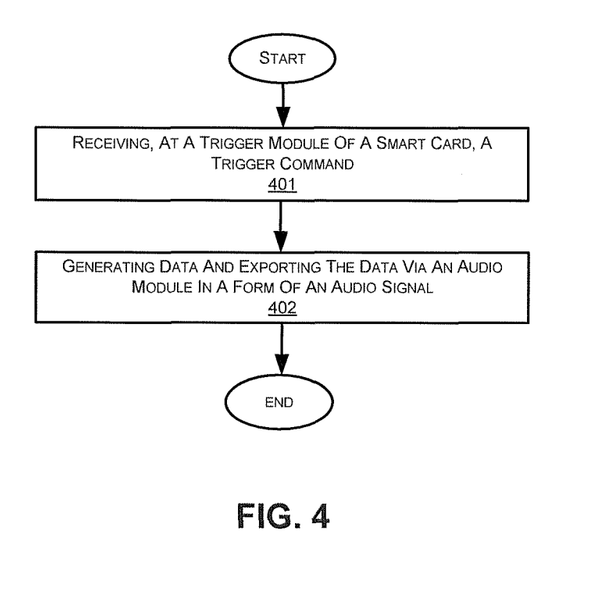
FIG. 4 is a flowchart representing an exemplary smart card communication process flow for transmitting data via an audio signal in accordance with an embodiment of this disclosure.

FIG. 4 is a flowchart representing an exemplary smart card communication process flow for transmitting data via an audio signal in accordance with an embodiment of this disclosure. A smart card (e.g., a smart card 100 shown in FIG. 1) of this embodiment comprises a power-supply module, a trigger module, a data processing module, and an audio output module. As further described below, FIG. 4 shows a process flow for the smart card transmitting data via an audio signal.

At step 401, a trigger module of the smart card receives a trigger command, which may be issued by a user through triggering the trigger module installed on a surface of the smart card. Before the trigger module receives the trigger command, the smart card operates in a low-power operating mode of an operation cycle. After receiving the trigger command, the trigger module activates the power-supply module to provide power for the data processing module of the smart card, which switches to a full-speed operating mode. In this mode, the smart card proceeds to step 402 till a data transmission process completes. Next, the smart card switches back to the low-power operating mode, and enters a next phase of the operation cycle.

At step 402, the smart card generates data to be output and outputs it in a form of an audio signal. Specifically, a processing sub-module in the data processing module of the smart card generates the to-be-output data in a digital format. An encoding module then encodes the digital data. Thereafter, a modulation module modulates the encoded digital data, and a digital-to-analog conversion module converts the modulated digital signal into an analog signal, and transmits the analog signal to an audio output module. The audio output module converts the analog signal into an audio signal and outputs the audio signal. The data to be output can be identification information, data of a monetary amount, etc. Before the data in the digital format is encoded, it may be further encrypted to enhance security of data transmission.

Figure 5:
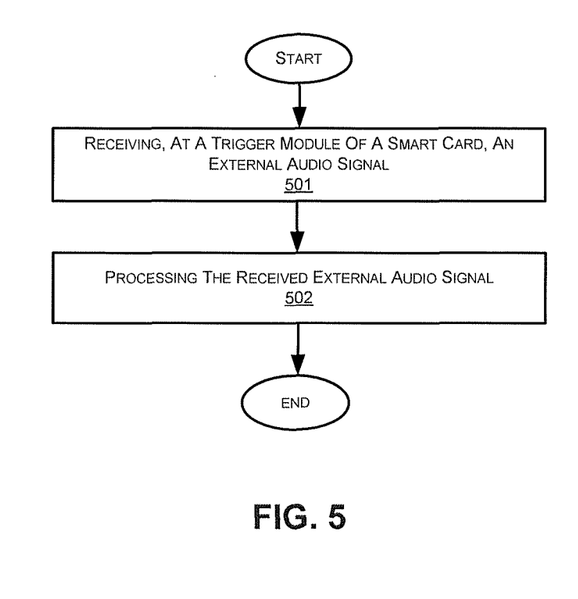
FIG. 5 is a flowchart representing an exemplary smart card communication process flow for receiving data via an audio signal in accordance with an embodiment of this disclosure.

FIG. 5 is a flowchart representing an exemplary smart card communication process flow for receiving data via an audio signal in accordance with an embodiment of this disclosure. The smart card (e.g., a smart card 100 shown in FIG. 1) of this embodiment comprises a power-supply module, a trigger module, a data processing module, and an audio input module. As further described below, FIG. 5 shows a process flow for the smart card receiving data via an audio signal.

At step 501, the trigger module of the smart card receives an external audio signal. In some embodiments, before the trigger module receives the external audio signal, the smart card operates in a low-power operating mode of an operation cycle. After receiving the external audio signal, the audio input module transmits a trigger command to the trigger module. After receiving the trigger command, the trigger module activates the power-supply module to provide power for the data processing module, and the smart card switches to a full-speed operating mode. In this mode, the smart card proceeds to step 502 till a data reception process completes. Next, the smart card switches back to the low-power operating mode, and enters a next phase of the operation cycle.

At step 502, the smart card processes the received audio signal. Specifically, an amplification module in the data processing module of the smart card amplifies the audio signal received by the audio input module. Next, a filtering module filters the amplified signal, and an analog-to-digital conversion module converts the filtered signal into a digital signal. In addition, a modulation module modulates the digital signal, a decoding module decodes the modulated signal, and a processing sub-module processes the decoded data. The data processing comprises recognizing, authenticating, and/or verifying identification information, and confirming, recharging, and deducting a monetary amount, etc. If the data is encrypted by the sender, then it also needs to be decrypted after it is decoded.

Figure 6:
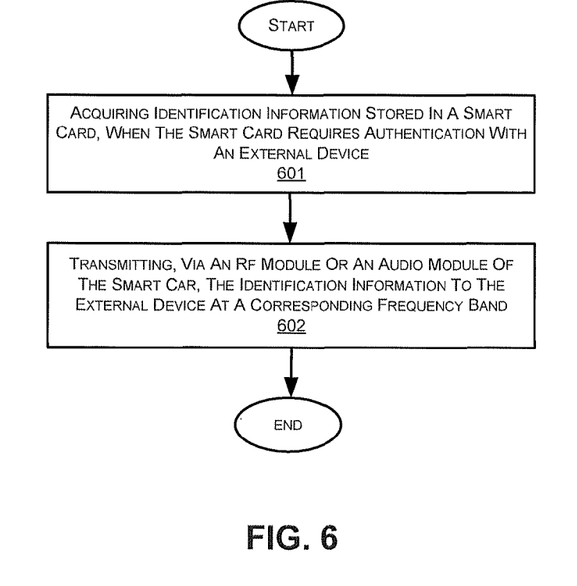
FIG. 6 is a flowchart representing an exemplary smart card authentication process flow in accordance with an embodiment of this disclosure.

FIG. 6 is a flowchart representing an exemplary smart card authentication process in accordance with an embodiment of this disclosure. The smart card (e.g., a smart card 100 shown in FIG. 1) of this embodiment comprises a data processing module, an audio module, and an RF module, each of which is coupled to the data processing module. The smart card may also comprise a rectifying and voltage-stabilizing module that is coupled to the RF module and the data processing module. The rectifying and voltage-stabilizing module can be used for rectifying and filtering an electromagnetic wave and/or an alternating magnetic field, which are coupled by an RF antenna module in the RF module, to convert them into stable DC current for providing power for the data processing module. In addition, the smart card may further comprise electronic paper, which is coupled to the data processing module. The electronic paper can display account information, prompting messages, transaction records, and/or remaining battery power level, during an identification authentication process and/or a mobile payment process between the smart card and an external device. As further described below, FIG. 6 shows a smart card authentication process.

At step 601, the smart card acquires identification information stored therein, when the smart card requires authentication with an external device. The identification information may be stored in a storage module of the smart card. The external device can be a reader-writer, card reader, mobile phone, netbook, or tablet computer.

At step 602, a smart card transmits, via an RF module or audio module, the identification information to an external device at a corresponding frequency band, enabling the external devices to perform authentication and realize identification certification and/or mobile payment according to the certification information. In some embodiments, when the external device is a card reader, the smart card may transmit, via an RF module, the identification information at a corresponding frequency band. When the external device is a mobile phone, the smart card may transmit, via an audio module, the identification information at a corresponding frequency band. In other words, for different external devices, the smart card can flexibly select an RF module or audio module to connect. Compared with conventional smart cards, which transmit identification information only via an RF channel, embodiments of the smart card disclosed herein possesses both audio and RF communication functions at the same time and can utilize different communication frequency bands, thereby meeting different application needs and bringing great convenience to users.

In some embodiments, prior to step 601, the authentication process may also comprise acquiring, at the smart card via an RF module or audio module, authentication information from a channel corresponding to the external device. Specifically, the smart card acquires, via the RF module, the authentication information in a form of an electromagnetic wave from an RF channel of the external device, and transmits the information to the data processing module. The data processing module acquires corresponding RF authentication information by demodulating, decoding, and/or decrypting the electromagnetic wave. Alternatively, the smart card acquires, via the audio module, the authentication information in a form of an audio signal, from an audio channel of the external device, and transmits the information to the data processing module. The data processing module acquires corresponding audio authentication information, by amplifying, filtering, analog-to-digital converting, demodulating, decoding, and/or decrypting, and other treatments on the audio signal.

At step 601, acquiring the identification information preconfigured in the smart card according to the authentication information includes two scenarios: the data processing module acquires RF identification information preconfigured in the smart card, according to the RF authentication information; or the data processing module acquires audio identification information preconfigured in the smart card, according to the audio authentication information. To ensure information security, the data processing module may also use keys to encrypt the acquired RF and/or audio identification information. For example, different keys can be used to encrypt the RF identification information and the audio identification information. The key for encrypting the RF identification information is different from the key for encrypting the audio identification information.

In some embodiments, the data processing module may comprise an RF channel processing module and an audio channel processing module. The RF channel processing module connects with the RF module, for processing an RF signal received by the RF module, generating data to be output, and outputting the data via the RF module in a form of an RF signal. For example, the RF channel processing module can obtain the corresponding RF authentication information by demodulating, decoding, and/or decrypting an electromagnetic wave received by the RF module. It can also encrypt the RF identification information (acquired according to the RF authentication information) according to a preconfigured first key.

The audio channel processing module connects with the audio module, for processing an audio signal received by the audio module, generating data to be output, and outputting the data via the audio module in a form of an audio signal. For example, the audio channel processing module can acquire the corresponding audio authentication information by amplifying, filtering, analog-to-digital converting, demodulating, decoding, and/or decrypting an audio signal received by the audio module. It can also encrypt the audio identification information (acquired according to the audio authentication information) according to a preconfigured second key, and modulate and encode the encrypted audio certification information.

In some embodiments, the data processing module may further comprise a storage device. The storage device can store the RF identification information, the audio identification information, the first key, and the second key.

At step 602, the smart card transmits, via an RF module or an audio module, the identification information to the external devices at a corresponding frequency band. The transmitting step comprises transmitting the RF identification information, via the RF module, to the external device at a corresponding frequency band; or transmitting the audio identification information, via the audio module, to the external device at a corresponding frequency band. In some embodiments, an audio output module of the audio module is a piezoelectric ceramic device, which comprises a piezoelectric ceramic thin film and an audio signal adjustment circuit. A user can trigger the piezoelectric ceramic thin film to activate an audio channel of the smart card, and utilize the audio channel to transmit the audio identification information to the external device at a corresponding frequency band. The external devices conducts authentication according to the audio identification information, to realize identification certification (verification) and/or mobile payment.

The above authentication methods can utilize different communication methods to communicate with an external device, thereby meeting different application needs and bringing great conveniences to users. Specifically, the smart card disclosed herein can use its audio channel to communicate with an audio channel of a mobile terminal. As a result, some mobile-terminal-based specific applications can be realized without providing a dedicated reader device, and users can manage a variety of different business applications through a smart card.

Figure 7:
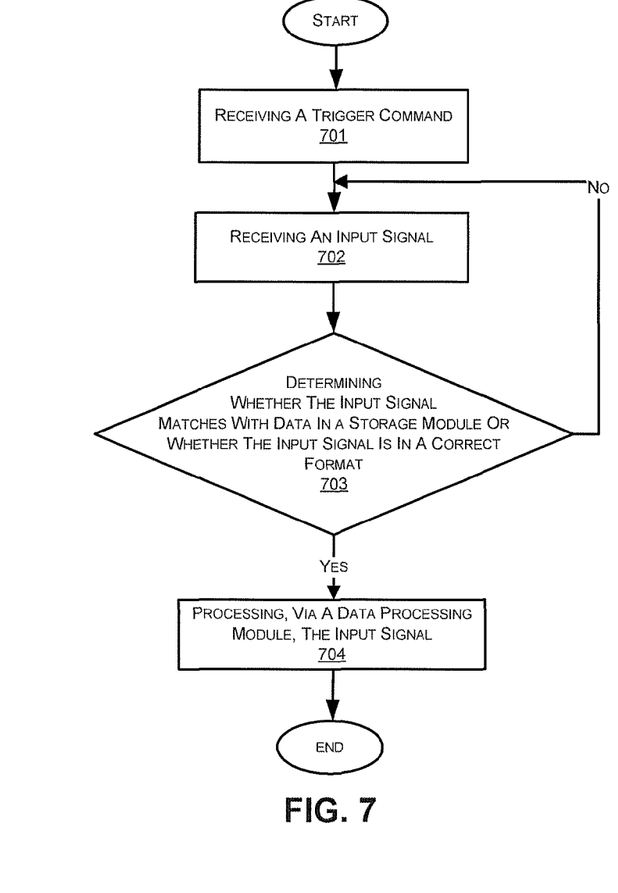
FIG. 7 is a flowchart representing an exemplary smart card communication process flow in accordance with an embodiment of this disclosure.

FIG. 7 is a flowchart representing an exemplary smart card communication method in accordance with an embodiment of this disclosure. The smart card (e.g., a smart card 100 shown in FIG. 1) of this embodiment comprises a power-supply module, a trigger module, a data processing module, and a storage module. Also, the smart card may comprise a keypad module and/or an audio input module, which are coupled to the data processing module. Further, the smart card may comprise a display module and/or an audio output module, which are coupled to the data processing module. As further described below, FIG. 7 shows an exemplary smart card communication process flow.

At step 701, the trigger module receives a trigger command, which can be used to control the smart card to start or stop operating. When receiving the trigger command, the trigger module starts the power-supply module, which starts operation to provide power to the data processing module. Afterwards, the power-supply module starts supplying power to the modules that connect with the data processing module, such as the storage module, keypad module, audio input module, display module, and audio output module.

The trigger module can also be manually triggered by a user when the trigger module is provided as, e.g., a push-button switch, touch switch, or DIP switch, which is located on a surface of the smart card. The trigger module can also be triggered by an external device via an audio signal. When receiving the external audio signal, the audio input module transmits a trigger command to the trigger module.

At step 702, an input signal is received. The input signal can either be a push-key signal received via the keypad module, or an external audio signal received via the audio input module.

At step 703, the data processing module determines whether the received input signal matches with data in storage module, or whether the received input signal is in a correct format. Specifically, when receiving the input signal via the keypad module, the data processing module matches the input signal with the data in storage module. When receiving the input signal via the audio input module, the data processing module determines whether the input signal is in a correct format.

If the input signal mismatches with the data in storage module, or the input signal format is incorrect, the process returns to step 702 and continues receiving an input signal. If the input signal matches with the data in storage module, or the input signal format is correct, the process proceeds to step 704, where the data processing module processes the input signal to obtain a processing result.

Specifically, in some embodiments, when a push-button switch as the trigger module closes, the power-supply module starts providing power for the data processing module, which starts operating. The display module starts displaying a prompting message, and the user's personal information inputted via the keypad module according to the prompting message. The data processing module determines whether the user personal information matches with data stored in the storage module. If they match, the data processing module processes the user personal information. The processing includes encryption, compression, addition of a security code, addition of user information, encoding, modulation, digital-to-analog conversion, converting to an analog signal, and transmission of the converted signal via the audio output module in a form of an audio signal.

In some other embodiments, when a microphone as the audio input module receives an external audio signal, the trigger module activates the power-supply module supplying power to the data processing module. The data processing module starts to operate, and acquires data in a digital format through amplification, filtering, analog-to-digital conversion, demodulation, decoding, decryption, and other treatments on the audio signal received by the microphone. Also, the data processing module carries out a format check on the acquired digital data. If a result of the format check shows that the data is in a correct format, the data processing module carries out follow-up treatment on the acquired digital data. For example, the data processing module encrypts, encodes, and modulates the acquired digital data, converts the digital data into an analog signal, and transmits the analog signal to the audio output module. The audio output module converts the analog signal into an audio signal and outputs the audio signal.

In some embodiments, the smart card comprises a power-supply module, a trigger module, and a data processing module. Also, the smart card may comprise a storage module, an audio input module, and an audio output module, which are coupled to the data processing module. The communication method of the smart card comprises writing the smart card's identification information in the smart card, and identifying a smart card or a user based on the stored identification information.

The process of writing the smart card's identification information in the smart card is further described below. When a push-button switch as the trigger module closes, the power-supply module provides power for the data processing module enabling it to operate. The audio input module receives an audio signal (transmitted by an external device) that carries the smart card's identification information. The data processing module acquires the smart card's identification information in a digital format through amplification, filtering, analog-to-digital conversion, demodulation, decoding, decryption and other treatments on the audio signal, and stores the digital identification information in the storage module.

The process of identifying a smart card or a user based on the stored smart card identification information is further described below. When using the smart card for identification, a user closes the push-button switch (as the trigger module). And then, the power-supply module provides power for the data processing module and enables it to operate. The data processing module encrypts, encodes, modulates, and conducts digital-to-analog conversion on the smart card identification information stored in the storage module. It further converts the identification information into an analog signal, and transmits the analog signal to the audio output module. The audio output module convert the analog signal into an audio signal and outputs the audio signal for an external device to receive. The external device receives the audio signal carrying the encrypted smart card identification information, and performs amplification, filtering, analog-to-digital conversion, demodulation, and decoding on the audio signal to acquire the smart card identification information. The external device determines whether the smart card identification information matches with preconfigured data for identifying a user's identity. The external device may also search corresponding databases for identity information, which corresponds to the smart card identification information, to confirm or acquire the user's identity information.

Figure 8:
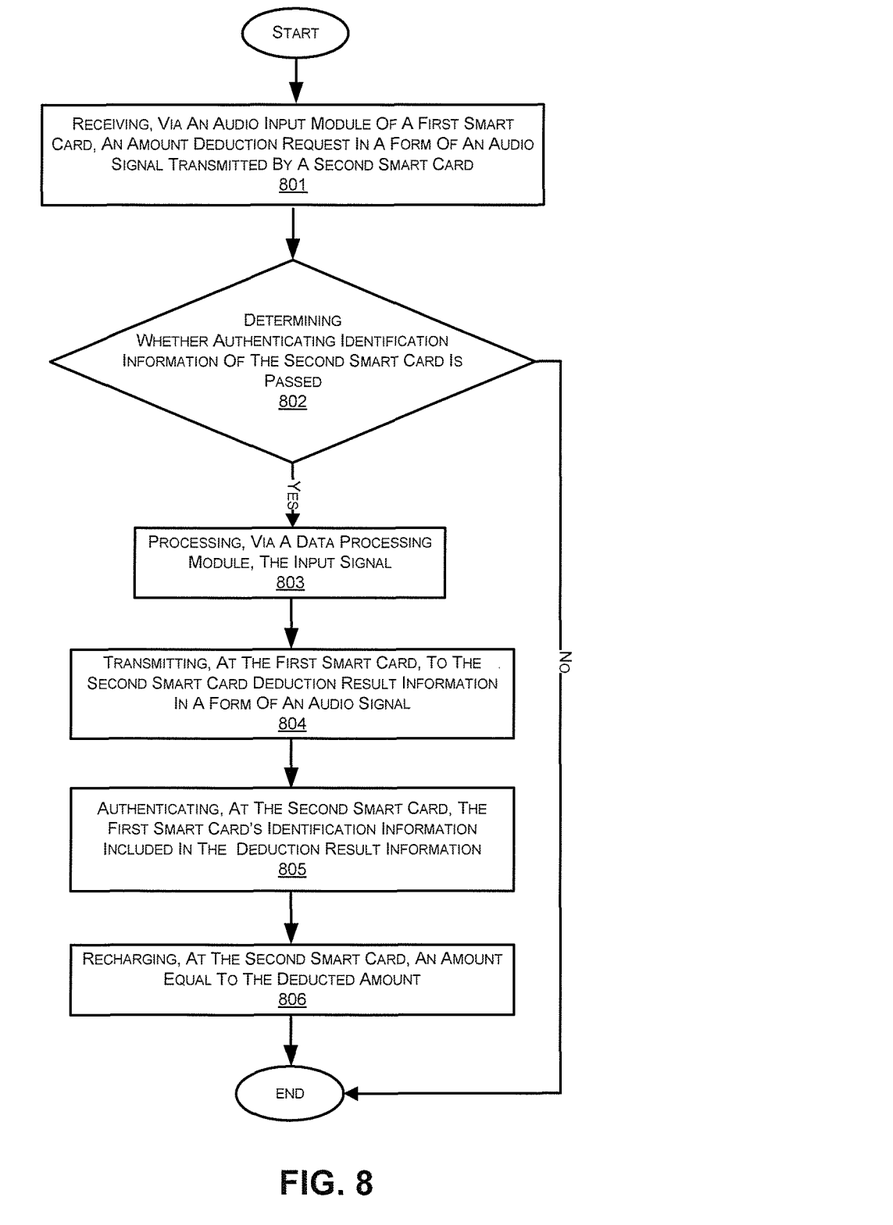
FIG. 8 is a flowchart representing an exemplary communication process flow in accordance with another embodiment of this disclosure.

FIG. 8 is a flowchart representing an exemplary smart card communication method in accordance with another embodiment of this disclosure. A first smart card (e.g., a smart card 100 shown in FIG. 1) comprises a data processing module and modules coupled to the data processing module, such as a power-supply module, an audio input module, an audio output module, and a storage module. In this embodiment, an external device that communicates with the first smart card is another smart card (e.g., another smart card 100 shown in FIG. 1). As further described below, FIG. 8 shows a process flow for communications between the first and second smart cards.

At step 801, the audio input module of the first smart card receives a monetary-amount deduction request in a form of an audio signal transmitted by an external smart card, i.e., the second smart card. The monetary-amount deduction request includes information about a monetary amount to be deducted and identification information of the second smart card.

In some embodiments, the second smart card transmits, on its own initiative, the monetary-amount deduction request to the first smart card. In this case, the monetary-amount-to-be-deducted information included in the monetary-amount deduction request can be inputted by a user to the second smart card via a manual input mode, or can be directly acquired by the second smart card from a transaction platform.

In some other embodiments, the second smart card can also transmit the monetary-amount deduction request to the first smart card after having received a payment request that is transmitted by the first smart card via its audio output module. Specifically, prior to step 801, the first smart card transmits the payment request in a form of an audio signal to the second smart card. The payment request includes amount to-be-paid information and the first smart card's identification information pre-stored in its storage module. After receiving the payment request, the second smart card authenticates the first smart card's identification information, and displays the amount-to-be-paid information to the user. After having passed the authentication and having received the user's confirmed operation instruction, the second smart card transmits the monetary-amount deduction request in the form of an audio signal to the first smart card. The monetary-amount-to-be-paid information in the payment request can be manually inputted to the first smart card by the user via a keypad module. In another embodiment, the first smart card can directly acquire the amount-to-be-paid information from a transaction platform via an Internet access module.

At step 802, the data processing module of the first smart card authenticates the second smart card's identification information included in the monetary-amount deduction request. If the authentication is passed, the process proceeds to step 803 or otherwise, it terminates.

At step 803, the first smart card's data processing module deducts a corresponding amount from monetary amount information preset in storage module, according to the monetary-amount-to-be-deducted information included in the monetary-amount deduction request. This preset amount can either be preset at the shipment of the first smart card, or recharged to the first smart card in advance by the user.

In some embodiments, after receiving the monetary-amount deduction request, the first smart card also displays, via a display interface of the display module, the monetary-amount-to-be-deducted information included in this monetary-amount deduction request, and receives, via a keypad module, an operation instruction inputted by the user. If the user inputs a confirmation of the operation instruction, it means that the user agrees with the deduction. In this case, the process proceeds to step 803, and deducts the corresponding amount from the preset amount according to the monetary-amount-to-be-deducted information. If the user inputs a cancellation of the operation instruction, it means that the user refuses the deduction. In that case, the process terminates.

In some embodiments, after step 803, the process also comprises additional steps, as described below. For example, at step 804, the first smart card transmits or feeds back, via an audio output module, to the second smart card deduction result information in a form of an audio signal. The deduction result information includes deducted-amount information and the first smart card's identification information. In some other embodiments, the first smart card also displays, via its display module, the deducted-amount information to the user, who can confirm via a keypad module the deducted-amount information. After having received the user's confirmation, the process proceeds to step 805.

At step 805, the second smart card authenticates the first smart card's identification information included in the received deduction result information. If the authentication is passed, the process proceeds to step 806. Otherwise, the process terminates.

At 806, the second smart card recharges itself an amount equal to the deducted monetary amount according to the deduction result information. In some embodiments, after receiving the deduction result information, the second smart card also displays, via a display module, the deducted-amount information included in deduction result information, and receives an operation instruction inputted by the user via a keypad module. If the user inputs a confirmation of the operation instruction, it means that the user confirms the first smart card's deduction amount. In this case, the second smart card recharges itself the equal amount according to the deducted-amount information included in the deduction result information. If the user inputs a cancellation of the operation instruction, it means that the users refuse the recharge. In that case, the process terminates.

Figure 9:
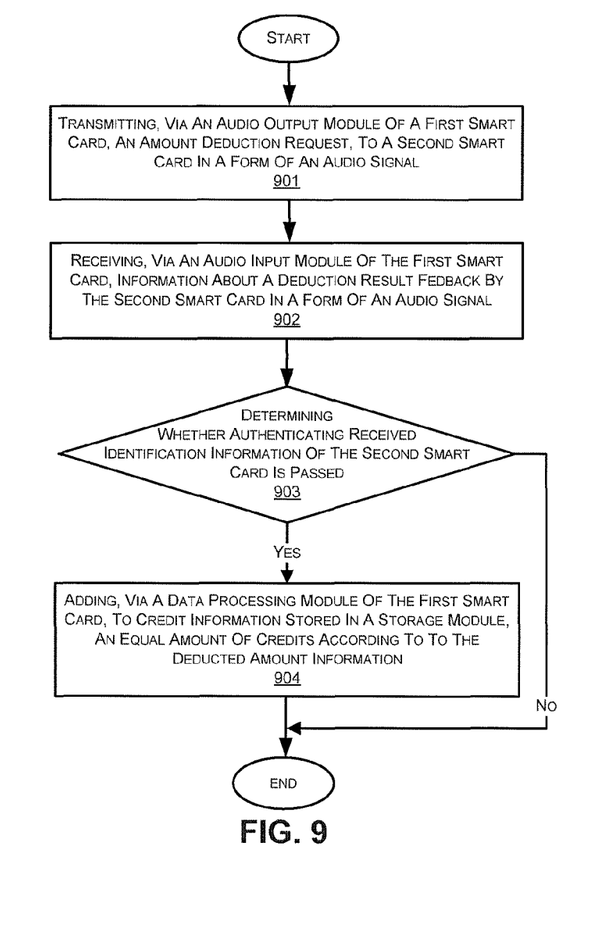
FIG. 9 is a flowchart representing an exemplary communication process flow in accordance with yet another embodiment of this disclosure.

FIG. 9 is a flowchart representing an exemplary communication method in accordance with yet another embodiment of this disclosure. The first smart card (e.g., a smart card 100 shown in FIG. 1) comprises a data processing module and modules coupled to the data processing module, such as a power-supply module, an audio input module, an audio output module, and a storage module. In this embodiment, an external device that communicates with the first smart card is another smart card (e.g., another smart card 100 shown in FIG. 1). As further described below, FIG. 9 shows a process flow for communications between the first and second smart cards.

At step 901, the first smart card transmits, via its audio output module and in a form of an audio signal, an amount deduction request to the second smart card. The amount deduction request includes amount-to-be-deducted information and the first smart card's identification information.

In some embodiments, the first smart card transmits, on its own initiative, the amount deduction request to the second smart card. In this case, the amount-to-be-deducted information in the amount deduction request can be inputted by a user to the first smart card via a manual input mode, or can be directly acquired by the first smart card from a transaction platform.

In some other embodiments, the first smart card transmits the amount deduction request to the second smart card after having received a payment request transmitted by the second smart card. Specifically, prior to step 901, the second smart card transmits the payment request in a form of an audio signal to the first smart card. The payment request includes amount-to-be-paid information and the second smart card's identification information. After receiving the payment request via its audio input module, the first smart card authenticates the second smart card's identification information, and displays the amount-to-be-paid information to the user. After having passed the authentication and received the user's confirmed operation instruction, the first smart card transmits the amount deduction request in the form of an audio signal to the second smart card. The amount-to-be-paid information in the payment request can be manually inputted to the second smart card by the user via a keypad module, or can be directly acquired by the second smart card from a transaction platform.

In some embodiments, before transmitting the amount deduction request, the first smart card also displays to the user, via its display module, the amount-to-be-deducted information in the deduction request, and receives the user's confirmation, amendment, or cancellation of an operation instruction via a keypad module. Until after receiving the user's confirmed operation instruction, the first smart card transmits, via its audio output module and in a form of an audio signal, the amount deduction request to the second smart card.

At step 902, the first smart card receives, via its audio input module, deduction result information transmitted or fed back by the second smart card via in a form of an audio signal. The deduction result information carries the deducted-amount information and the second smart card's identification information. Prior to this step, the second smart card has authenticated the first smart card according to the first smart card's identification information included in the amount deduction request of step 901, and completed the deduction according to the amount-to-be-deducted information included in the deduction request.

At step 903, the data processing module of the first smart card authenticates the identification information of the second smart card. If the authentication is passed, the process proceeds to step 904. Otherwise, the process terminates.

At step 904, after the authentication is passed, the data processing module of the first smart card recharges, to amount information stored in the storage module of the first smart card, an amount equal to the deducted-amount included in the deduction result information.

In some embodiment, after receiving via its audio input module deduction result information, the first smart card displays via its display module the deducted-amount information included in the deduction result information. The user can confirm, via a keypad module, the displayed deducted-amount information. After receiving the user's confirmed operation instruction, the first smart card recharges itself an equal amount according to the deducted-amount information.

The present disclosure also provides a communication system comprising a smart card and an external device. The smart card communicates with the external device via an audio signal and/or an RF signal. The external device can be, but is not limited to, e.g., a mobile phone, netbook, tablet PC, card reader device, smart card, etc.

In some embodiments, the card reader device comprises a power-supply module, a trigger module, a data processing module, and an audio output module. In some embodiments, the card reader device also comprises a storage module, a power-supply module, an RF module, etc.

The process for the card reader device to transmit data via an audio signal is described below. At a first step, the card reader device receives a trigger command. The trigger command can be transmitted either by a user triggering the trigger module located on a surface of the card reader device, or by the user through a computer connected with the card reader device. In some embodiments, prior to receiving the trigger command, the card reader device is in a low-power operating mode. After receiving the trigger command, the device switches to a full-operating mode. In this mode, the device proceeds to a second step till completing a data transmission process, and then switches back to the low-power operating mode and enters a next cycle phase.

At the second step, the card reader device generates data to be output, and outputs it in a form of an audio signal. Specifically, a processing sub-module in the data processing module of the card reader device generates the to-be-output data in a digital format. An encoding module then encodes the digital data. A modulation module modulates the encoded data. A digital-to-analog conversion module converts the modulated digital signal (data) into an analog signal and outputs it to the audio output module, which converts the analog signal into an audio signal and transmits the audio signal. The to-be-output data can be identification information, amount data, etc. Before encoding the digital data, the card reader device may encrypt the digital data to enhance the security of data transmission.

In some embodiments, the card reader device receives data via an audio signal, as further described below. At a first step, the card reader device receives an external audio signal. In some embodiments, an audio input module of the card reader device receives the external audio signal. Prior to receiving the external audio signal, the card reader device is in a low-power operating mode. After receiving the signal, it switches to a full-speed operating mode. In this mode, the device proceeds to a second step till completing a data receiving process, and then switches back to the low-power operating mode and enter a next cycle phase.

At the second step, the card reader device processes the received audio signal. Specifically, an amplification module in the data processing module of the card reader device amplifies the audio signal received by the audio input module. A filtering module filters the amplified signal. An analog-to-digital conversion module converts the filtered signal into a digital signal. A modulation module modulates the digital signal, and a decoding module decodes the demodulated signal. A processing sub-module processes the decoded data. The processing includes verifying or authenticating identification information, and confirming, recharging, and/or deducting a monetary amount included in the data, etc. If the data is encrypted by the sender, then it needs to be decrypted after the decoding.

The illustrated configuration of the smart card described in this disclosure is exemplary only, and can be modified to provide discrete elements or combine multiple elements into a single one, and be provided as any combination of hardware and software components. The smart card described by this disclosure possesses communication functions, and can be used for anti-counterfeiting, identity recognition or authentication, etc. Also, the smart card's audio signal is not easily affected by metal materials and the surrounding environment. The smart card can be made using metal casing, resulting in a beautiful appearance, a superior quality, and innovative and unique features. Therefore, it can stimulate market consumption, and be applicable in special scenes.

Furthermore, the smart card disclosed herein also possesses functions such as encryption, decryption, authentication, certification, and so on, ensuring the safety of audio communication. It also includes RF communication, keyboard inputting, display, and other functions. Among them, the RF communication function expands communication methods of the smart card, satisfying users' different application needs. The keyboard inputting and display functions realize interactions between users and the smart card, enabling the users to directly input and check information on the smart card. Moreover, the smart card also includes a power-supply module, ensuring a normal operation of the smart card at any time. Further, the smart card can include a trigger module to control starting or stopping the smart card, and to facilitate the users to start or activate the smart card when needed and turn off the smart card when not needed.

It will now be appreciated by one of ordinary skill in the art that methods disclosed herein can be altered to modify steps, delete steps, or include additional steps. In addition, the methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computing device, or multiple computing device. A computer program may be written in any form of programming language, including compiled or interpreted languages, and it may be deployed in any form, including as a standalone program or as a module, component, subroutine, or other unit suitable for use in a computing environment. A computer program may be deployed to be executed on one computing device or on multiple computing devices at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing the methods disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A smart card communication method, comprising:
   selecting, by a channel-switching module, a first audio module for communication between a first smart card and a second smart card, the first audio module being independent from a radio frequency (RF) module;
   activating the first audio module based on the selection;
   disconnecting the RF module based on the selection, wherein the RF module includes an RF antenna for communicating RF signals;
   receiving, at the first smart card having the first audio module, a monetary-amount deduction request in a form of an external audio signal from the second smart card having a second audio module, wherein the monetary-amount deduction request includes information about a monetary amount to be deducted and identification information of the second smart card, wherein the first audio module and the second audio module include one or more piezoelectric devices for providing audio signals;
   authenticating, at the first smart card having a first data processing module, the identification information of the second smart card;
   modifying, by the first data processing module, monetary information stored in the first smart card according to the information about the monetary amount to be deducted after the authentication of the identification information of the second smart card is passed;

generating, by the first data processing module, monetary-amount-deduction result information;

transmitting, by the first audio module, to the second audio module of the second smart card the monetary-amount-deduction result information in a form of an audio signal, the monetary-amount-deduction result information including information about a deducted monetary amount and identification information of the first smart card to be authenticated by the second smart card; and adding, at the second smart card, the deducted monetary amount to a monetary amount stored in the second smart card according to the information about the deducted monetary amount after the authentication of the identification information of the first smart card is passed.

2. The smart card communication method of claim 1, further comprising:

conducting, by the first data processing module, amplification, filtering, analog-to-digital conversion, demodulation, and decoding on the received external audio signal to obtain decoded data.

3. The smart card communication method of claim 2, further comprising:

decrypting, authenticating, and/or certifying, by the first data processing module, the decoded data.

4. The smart card communication method of claim 1, wherein generating and transmitting the monetary-amount-deduction result information comprises:

generating, by the first data processing module, the monetary-amount-deduction result information in a digital format;

performing, by the first data processing module, encoding, modulation, digital-to-analog conversion on the monetary-amount-deduction result information in the digital format to obtain analog data; and transmitting, by the first data processing module, the analog data to the first audio module that outputs to the second smart card the analog data in a form of an audio signal.

5. The smart card communication method of claim 1, further comprising:

receiving a first trigger command for controlling the first smart card to start operating, before receiving the external audio signal or transmitting to the second smart card the monetary-amount-deduction result information in the form of the audio signal; and receiving a second trigger command for controlling the first smart card to stop operating, after completing the receiving or the transmitting.

6. The smart card communication method of claim 1, further comprising:

generating, by the first data processing module, a payment request; and transmitting, by the first audio module, to the second audio module of the second smart card the payment request in a form of an audio signal, wherein:

the payment request includes information about a monetary amount to be paid and identification information of the first smart card to be authenticated by the second smart card; and after the authentication of the identification information of the first smart card is passed, the monetary-amount deduction request is generated and transmitted to the first smart card.

* * * * *